(12) United States Patent
Park et al.

(10) Patent No.: US 8,014,238 B2
(45) Date of Patent: Sep. 6, 2011

(54) OPTICAL PICKUP DEVICE

(75) Inventors: Se June Park, Seoul (KR); Seok Jung Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 586 days.

(21) Appl. No.: 12/037,247

(22) Filed: Feb. 26, 2008

(65) Prior Publication Data

US 2009/0010138 A1   Jan. 8, 2009

(30) Foreign Application Priority Data

Jul. 2, 2007  (KR) ................. 10-2007-0066090

(51) Int. Cl.
   *G11B 7/00* (2006.01)
(52) U.S. Cl. ................. 369/44.15; 369/112.22; 369/139
(58) Field of Classification Search ............ 369/112.23, 369/100, 112.08, 139, 44.15; 359/694; 720/679
   See application file for complete search history.

(56) References Cited

U.S. PATENT DOCUMENTS

| | | |
|---|---|---|
| 2003/0112533 A1 | 6/2003 | Nakanishi et al. |
| 2003/0161228 A1 | 8/2003 | Wada |
| 2005/0111311 A1 | 5/2005 | Funakoshi |
| 2005/0210488 A1 | 9/2005 | Kojima |
| 2005/0225875 A1 | 10/2005 | Wada et al. |
| 2007/0050802 A1 | 3/2007 | Isobe et al. |

FOREIGN PATENT DOCUMENTS

| | | |
|---|---|---|
| EP | 1411504 | 4/2004 |
| JP | 2003-151155 | 5/2003 |
| JP | 2003/151155 | * 5/2003 |

OTHER PUBLICATIONS

Office Action issued in corresponding European Patent Application No. 08102656.9 dated Dec. 29, 2008.

* cited by examiner

*Primary Examiner* — Hoa T Nguyen
*Assistant Examiner* — Andrew J Sasinowski
(74) *Attorney, Agent, or Firm* — Stanzione & Kim, LLP

(57) ABSTRACT

An optical pickup device to provide a stable operation in both low-speed and high-speed modes by controlling a change in natural frequency, the optical pickup device including: a lens holder to support an objective lens; a supporting unit spaced apart from the lens holder; and a plurality of suspension members each having one end fixed to the lens holder and another end supported by the supporting unit to enable a movement of the lens holder, wherein the supporting unit includes a fixing member, a coupling portion provided in the fixing member to couple each suspension member, magnetic fluid received in the coupling portion, and an excite device to apply a magnetic field to the magnetic fluid.

17 Claims, 4 Drawing Sheets

OPTICAL PICKUP DEVICE

CROSS-REFERENCE TO RELATED APPLICATIONS

This application claims the benefit of Korean Application No. 2007-66090, filed Jul. 2, 2007 in the Korean Intellectual Property Office, the disclosure of which is incorporated herein by reference.

BACKGROUND OF THE INVENTION

1. Field of the Invention

Aspects of the present invention relate to an optical pickup device to read information recorded on an optical disk or to record new information on the optical disk.

2. Description of the Related Art

An optical pickup device is a device to read information recorded on an optical disk (such as a compact disk (CD), digital video disk (DVD), and a blu-ray disk (BD)) or to record new information on the optical disk by irradiating a laser beam onto the optical disk. If a focus of a laser beam irradiated onto a disk is deflected, the optical pickup device moves an objective lens in a radial direction of the disk or in an optical axis direction, thereby correcting the focus of the laser beam.

Korean Patent Laid-Open Publication No. 2006-0125193 discloses an example of an optical pickup device. The conventional optical pickup device comprises a lens holder on which an objective lens is mounted, a focus coil and a tracking coil coupled to the lens holder to move the lens holder in a radial direction of a disk or in an optical axis direction, magnets arranged close to the focus coil and the tracking coil, and a plurality of suspension wires to support the lens holder in a movable manner. Each suspension wire has one end fixed to the lens holder and another end fixed to another holder filled with gel. The suspension wire has a predetermined elasticity sufficient to movably support the lens holder.

In the conventional optical pickup device, a resonance frequency is determined based on a weight or a structure of the lens holder and properties (material, diameter, length, etc.) of the suspension wire used to fix the lens holder. Also, when designing a servo system to focus or to track the objective lens, the characteristics of the resonance frequency should be considered.

However, since the resonance frequency is a fixed value, the conventional optical pickup device does not compensate for an increase or a reduction in a rotation frequency of an optical disk drive. Specifically, an optical pickup device designed for a low-speed mode cannot easily be used for a high-speed mode, and an optical pickup device designed for a high-speed mode cannot easily be used for a low-speed mode. Moreover, if an optical disk drive operates at a higher speed than a predetermined speed, it causes significant disturbance as well as excessive deflection and eccentricity of an optical disk. Therefore, the optical pickup device may suffer from an unstable operation thereof.

SUMMARY OF THE INVENTION

Aspects of the present invention has provide an optical pickup device wherein a natural frequency can be changed according to a change in the rotation frequency of an optical disk, such that the optical pickup device can accomplish a stable operation in both low-speed and high-speed modes.

According to an aspect of the present invention, there is provided an optical pickup device including: a lens holder to support an objective lens; a supporting unit spaced apart from the lens holder; and one or more suspension members, each having one end fixed to the lens holder and another end supported by the supporting unit, to enable a movement of the lens holder, wherein the supporting unit includes a fixing member, one or more coupling portions provided in the fixing member to couple each suspension member, magnetic fluid surrounding a portion of each suspension member, and an excite device to apply a magnetic field to the magnetic fluid.

The coupling portion may include a first coupling portion having a first elastically deformable coupling agent, a second coupling portion having a second elastically deformable coupling agent, the second coupling portion being spaced apart from the first coupling portion, and a space defined between the first coupling portion and the second coupling portion having the magnetic fluid provided therein.

The excite device may include at least one excite coil provided on the fixing member at a position close to the magnetic fluid.

The excite coil may be provided on at least one of an upper surface, a lower surface, and side surfaces of the fixing member.

The excite coil may be provided to surround the magnetic fluid.

According to another aspect of the present invention, there is provided a method of stably supporting an objective lens in an optical pickup device including an optical disk drive to rotate an optical disk, the method including: fixing a first end of one or more suspension members to a lens holder that holds the objective lens, and a second end of each suspension member to a supporting unit of the optical pickup device to enable a movement of the lens holder; supplying power to a magnetic fluid surrounding the one or more suspension members in the supporting unit in order to apply a magnetic field to the magnetic fluid and control a length of a deformable portion of each suspension member.

According to another aspect of the present invention, there is provided a supporting unit in an optical pickup device including an optical disk drive to rotate an optical disk and an objective lens in a lens holder spaced apart from the supporting unit to direct light to the optical disk, the supporting unit including: a fixing member to support one or more suspension members connecting the supporting unit to the lens holder, the one or more suspension members enabling a movement of the lens holder; one or more coupling portions to couple each suspension member; magnetic fluid surrounding a portion of each suspension member; and an excite device to apply a magnetic field to the magnetic fluid, such that a viscosity of the magnetic fluid and a length of a deformable portion of each suspension member are controlled.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
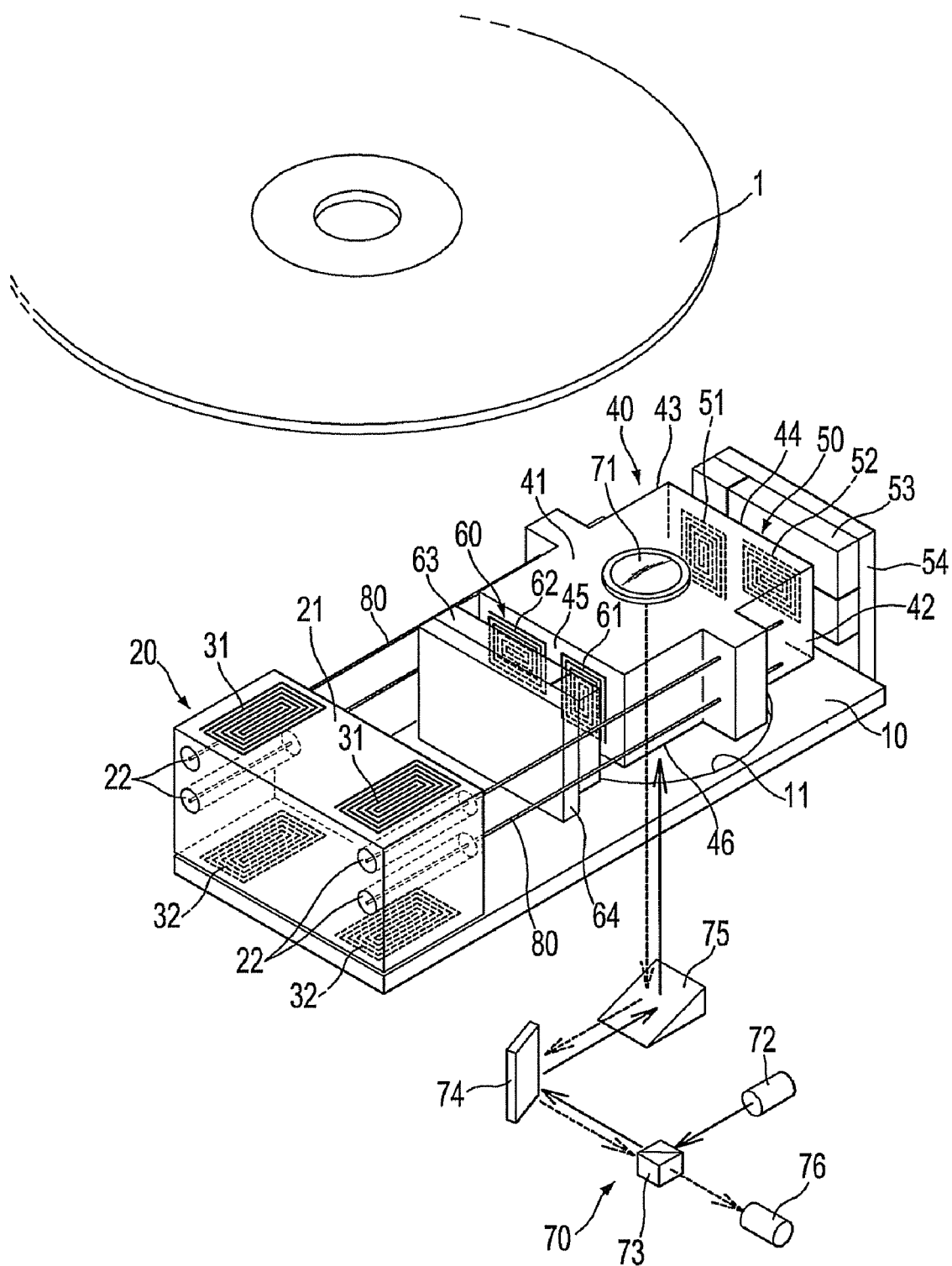
FIG. 1 is an exploded perspective view of an optical pickup device according to an embodiment of the present invention.

Reference will now be made in detail to present embodiments of the present invention, examples of which are illustrated in the accompanying drawings, wherein like reference numerals refer to like elements throughout. The embodiments are described below in order to explain the present invention by referring to the figures.

FIG. 1 is an exploded perspective view of an optical pickup device according to an embodiment of the present invention. Referring to FIG. 1, the optical pickup device includes a supporting unit 20 mounted on a base 10, and a lens holder 40 supported by a plurality of suspension members 80 in a position displaceable manner. The optical pickup device further includes an optical pickup unit 70 to read information recorded on an optical disk 1 or to record new information on the disk 1.

Figure 2:
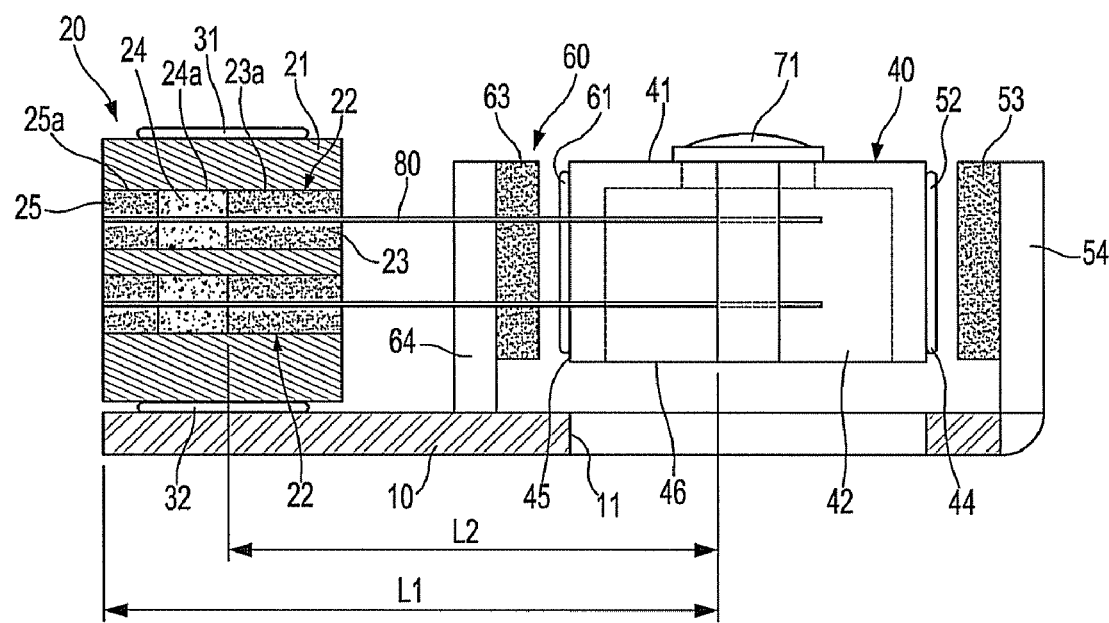
FIG. 2 is a sectional view illustrating the coupling of suspension members included in the optical pickup device according to an embodiment of the present invention.

The lens holder 40, as shown in FIGS. 1 and 2, includes an upper surface 41 on which an objective lens 71 is mounted, first and second side surfaces 42 and 43 as lateral surface thereof, third and fourth side surfaces 44 and 45, and a lower surface 46. The suspension members 80 having an elasticity are coupled to the first and second side surfaces 42 and 43. The lens holder 40 may have a rectangular parallelepiped shape. Furthermore, the lens holder 40 is supported by the suspension members 80 such that the lens holder 40 is displaceable vertically or horizontally by a predetermined range. The objective lens 71 mounted on the upper surface 41 is oriented to face a lower surface of the optical disk 1. Moreover, the lower surface 46 of the lens holder 40 is opened to define an optical path extending to the objective lens 71. Accordingly, the base 10 has an opening 11 formed at a position corresponding to the opened lower surface 46 of the lens holder 40, to define the optical path.

The optical pickup unit 70 includes a laser diode 72, a half mirror 73, a first reflective mirror 74, a second reflective mirror 75, and a photo diode 76. The half mirror 73 transmits a part of a laser beam and reflects another part of the laser beam. The first and second reflective mirrors 74 and 75 lead the laser beam having passed through the half mirror 73 to the objective lens 71. Accordingly, if the laser diode 72 emits a laser beam, the laser beam is irradiated onto the first reflective mirror 74 by the half mirror 73, and then, is irradiated onto the objective lens 71 by reflection of the first and second reflective mirrors 74 and 75. However, it is understood that according to other aspects, more mirrors, less mirrors, or a different arrangement of mirrors may be provided to lead the laser beam between the laser diode 72 and the objective lens 71.

The objective lens 71 condenses the laser beam so as to form a beam spot on a recording layer of the optical disk 1. The laser beam is also reflected from the recording layer of the optical disk 1, and is irradiated to the photo diode 76 through the second reflective mirror 75, the first reflective mirror 74, and the half mirror 73 in sequence. The photo diode 76 converts the reflected beam into electric signals, and outputs the electric signals in order to reproduce the signals recorded on the optical disk 1.

The third and fourth side surfaces 44 and 45 of the lens holder 40 are provided with drive units 50 and 60, respectively. The drive units 50 and 60 move the lens holder 40 in a radial direction of the optical disk 1 or an optical axis direction in order to correct the focus of the laser beam. The drive unit 50 includes a first tracking coil 51 and a first focus coil 52 provided on the third side surface 44 of the lens holder 40, and a first magnet 53 installed to face the first tracking coil 51 and the first focus coil 52. The drive unit 60 includes a second tracking coil 61 and a second focus coil 62 installed at the fourth side surface 45 of the lens holder 40, and a second magnet 63 installed to face the second tracking coil 61 and the second focus coil 62. The first magnet 53 and the second magnet 63 are supported by first and second yokes 54 and 64 mounted on the base 10.

In operation of the drive units 50 and 60, if power is supplied to the first and second tracking coils 51 and 61 and/or the first and second focus coils 52 and 62, the lens holder 40 is moved in a radial direction (tracking direction) and/or optical axis direction (focus direction) of the optical disk 1 via interaction of the first and second magnets 53 and 63, thereby correcting the focus of the laser beam. The principle of correcting the focus of the laser beam is known, and thus, a detailed description thereof will be omitted.

Each of the suspension members 80 to support the lens holder 40, as shown in FIGS. 1 and 2, has one end fixed to the associated first side surface 42 or second side surface 43 of the lens holder 40 and the other end supported by the supporting unit 20 mounted on the base 10. In the present embodiment, each suspension member 80 is an elastic wire having a diameter of approximately 0.1 mm, and two suspension members 80 are allotted at either lateral side of the lens holder 40. However, it is understood aspects of the present invention are not limited thereto, and the number, shape, and/or locations of the suspension members 80 may be changed in consideration of design conditions.

The supporting unit 20 to support the plurality of suspension members 80 includes a fixing member 21 having a rectangular block shape. The fixing member 21 has a lower surface attached to an upper surface of the base 10. Also, the fixing member 21 has bore-shaped coupling portions 22 formed at opposite lateral positions thereof, to allow the respective suspension members 80 to penetrate longitudinally through the fixing member 21.

Each coupling portion 22, as shown in FIG. 2, includes a first coupling portion 23a filled with a coupling agent 23, a magnetic-fluid receiving portion 24a filled with magnetic fluid 24, and a second coupling portion 25a filled with a coupling agent 25. The first coupling portion 23a, the magnetic-fluid receiving portion 24a, and the second coupling portion 25a are located sequentially from the lens holder 40. The magnetic fluid receiving portion 24a may be defined by a hermetic space between the first and second coupling portions 23a and 25a. The length of the first coupling portion 23a may be longer than the length of the second coupling portion 25a.

The coupling agents 23 and 25 filled in the first and second coupling portions 23a and 25a may be silicon-based adhesives to be cured by irradiation of ultraviolet rays. Once solidified, the coupling agents 23 and 25 support the suspension members 80 at positions spaced apart from the fixing member 21 without a risk of separation. In addition, the coupling agents 23 and 25 have a predetermined elasticity sufficient to attenuate vibrations of the suspension members 80 transmitted from the lens holder 40. That is, the coupling agents 23 and 25 can attenuate vibrations transmitted through the suspension members 80 since the coupling agents 23 and 25 do not completely fix the suspension members 80 although the coupling agents 23 and 25 support the suspension members 80. The above described coupling configuration has an effect on the determination of a natural frequency of the suspension members 80.

The magnetic fluid 24 filled in the magnetic-fluid receiving portion 24a may be colloid solution in which ferromagnetic particles are uniformly dispersed in fluid (for example, water or oil). If a magnetic field is applied to the magnetic fluid 24, the arrangement of the particles included in the magnetic fluid 24 is changed, causing a change in viscosity. Specifically, although the magnetic fluid 24 keeps a liquid state when no magnetic field is applied thereto, if a magnetic field is applied to the magnetic fluid 24, the particles included in the fluid form chains, causing an increase in the viscosity of the magnetic fluid 24, and consequently, changing the magnetic fluid 24 to a gel-state.

To couple the suspension members 80 into the coupling portions 22, first, the coupling agent 23 is filled into the first coupling portion 23a. After solidification of the first coupling agent 23, the magnetic fluid 24 is filled in the magnetic-fluid receiving portion 24a. Finally, the coupling agent 25 is filled into and solidified in the second coupling portion 25a. In this way, the magnetic fluid 24 is hermetically received in the magnetic-fluid receiving portion 24a.

Figure 3:
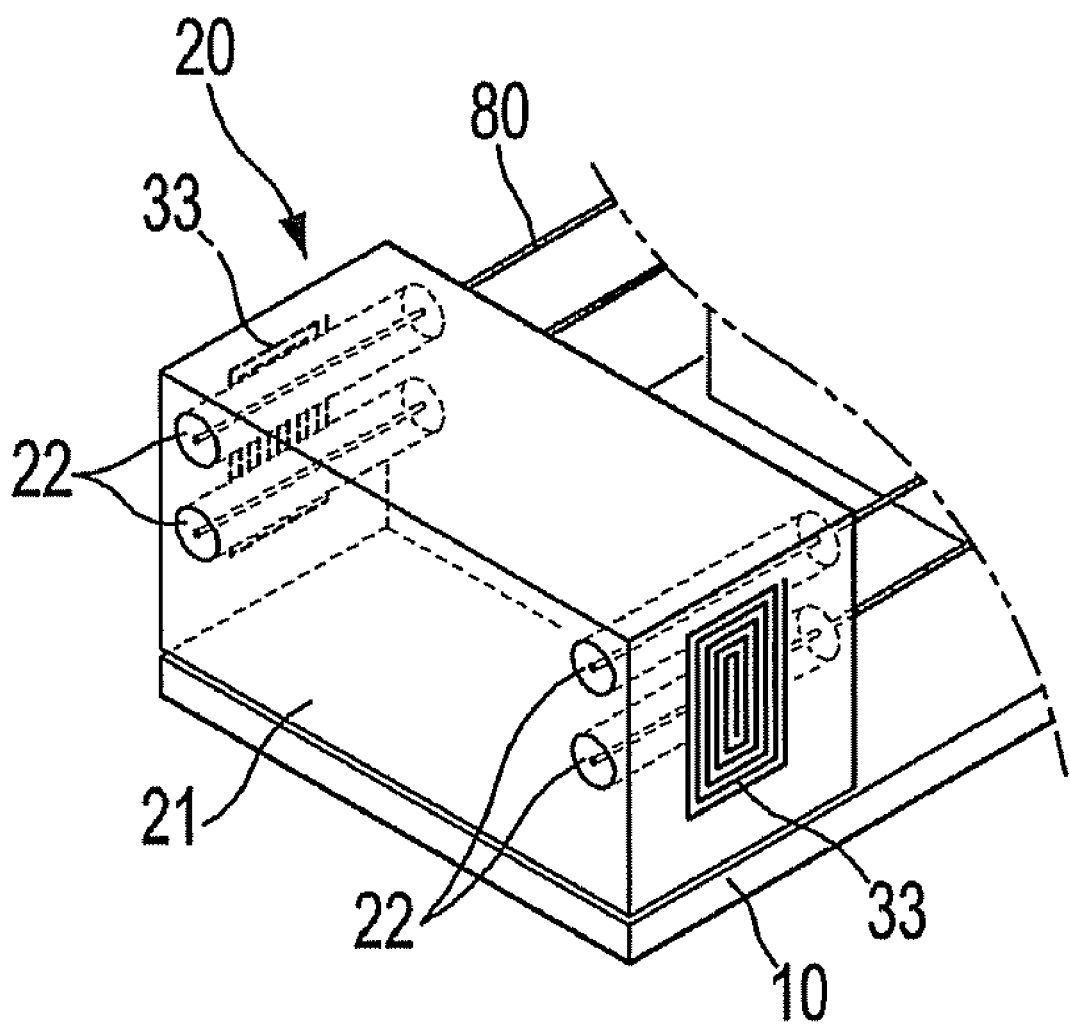
FIG. 3 is a perspective view of a supporting unit included in the optical pickup device, illustrating excite coils installed to a side surface of a fixing member, according to another embodiment of the present invention.
Figure 4:
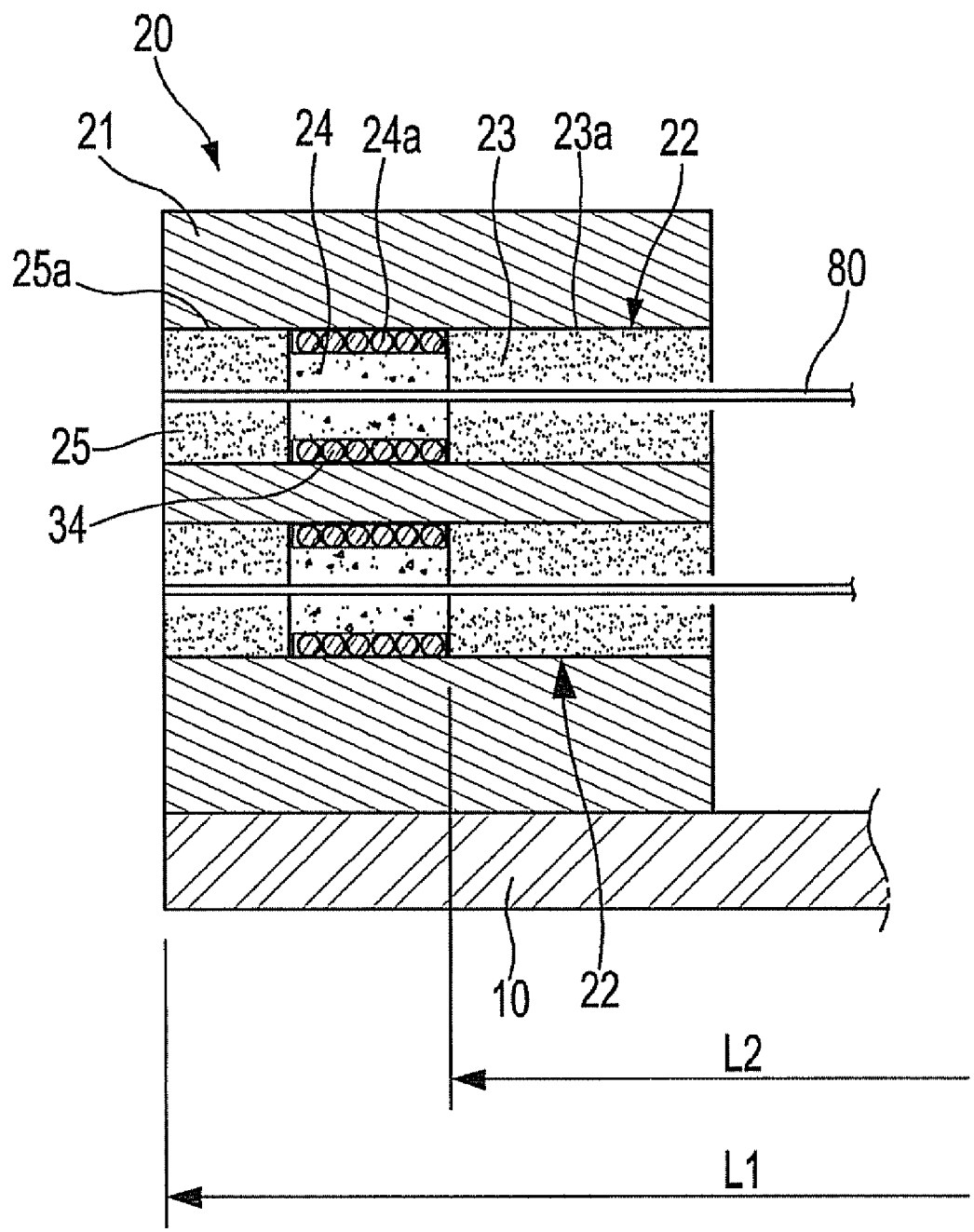
FIG. 4 is a sectional view of the supporting unit, illustrating excite coils installed in a magnetic-fluid receiving portion, according to an embodiment of the present invention.

The fixing member 21 may be installed with an excite device to apply a magnetic field to the magnetic fluid 24. The excite device includes excite coils 31 and 32 to create a magnetic field upon receiving power. In the embodiment shown in FIGS. 1 and 2, the excite coils 31 and 32 are provided at upper and lower surfaces of the fixing member 21 at positions close to the magnetic fluid 24 in order to facilitate the application of the magnetic field to the magnetic fluid 24. According to another embodiment (shown in FIG. 3), excite coils 33 are installed at opposite side surfaces of the fixing member 21 in positions close to the magnetic fluid 24. Also, in yet another embodiment (shown in FIG. 4), an excite coil 34 is installed in each magnetic-fluid receiving portion 24a to surround the magnetic fluid 24. Although the illustrated embodiments of the present invention illustrate the coil-shaped excite devices, it is understood that aspects of the present invention are not limited thereto. For example, a permanent magnet may be located close to or spaced apart from the magnetic fluid 24, to control a magnetic field to be applied to the magnetic fluid 24.

With the above described configuration, as power is supplied to the excite coils 31, 32, 33, and 34 to apply a magnetic field to the magnetic fluid 24, the viscosity of the magnetic fluid 24 can be changed. That is, by controlling electric current to be supplied to the excite coils 31, 32, 33, and 34, the magnetic field to be applied to the magnetic fluid can be controlled, resulting in a change in the viscosity of the magnetic fluid 24. This process of supplying power and applying a magnetic field will now be described in detail.

When no power is supplied to the excite coils 31, 32, 33, and 34, the magnetic fluid 24 is kept in a liquid state. In this case, in addition to a portion exposed to the outside, another portion of the suspension member 80 inserted through the first coupling portion 23a, the magnetic fluid-receiving portion 24a, and the second coupling portion 25a is in a deformable state. Accordingly, this deformable portion of the suspension member 80 has a length represented by L1 in FIG. 2. On the contrary, when power is supplied to the excite coils 31, 32, 33, and 34 to apply a magnetic field to the magnetic fluid 24, the magnetic fluid 24 increases in viscosity, thereby changing to a gel state and restraining the suspension member 24. Accordingly, the deformable portion of the suspension member 80 has a length represented by L2 in FIG. 2.

With a change in the length of the deformable portion of the suspension member 80, the suspension member 80 has a change in natural frequency. In other words, if the viscosity of the magnetic fluid 24 increases as power is supplied to the excite coils 31, 32, 33, and 34, the natural frequency of the suspension member 80 also increases. Furthermore, since the strength of the magnetic field to be applied to the magnetic fluid 24 can be adjusted by adjusting the strength of electric current supplied to the excite coils 31, 32, 33, and 34, the natural frequency of the suspension member 80 can be controlled.

As described above, the optical pickup device according to aspects of the present invention can actively deal with an increase or reduction in the rotation frequency of an optical disk drive. For example, when the optical disk drive operates in a low-speed mode, no (or low) power is supplied to the excite coils 31, 32, 33, and 34 to keep the magnetic fluid 24 in a liquid state, whereby the natural frequency of the optical pickup device can be reduced to correspond to an operating speed of the optical disk drive. In contrast, when the optical disk drive operates in a high-speed mode, power is supplied to the excite coils 31, 32, 33, and 34 to change the magnetic fluid 24 to a high-viscosity gel state, whereby the natural frequency of the optical pickup device can be increased to correspond to the operating speed of the optical disk drive. Accordingly, the optical pickup device according to aspects of the present invention can change the natural frequency thereof according to a change in the rotation frequency of an optical disk 1, thereby achieving a stable operation in both low-speed and high-speed modes.

Furthermore, according to aspects of the present invention, the natural frequency of the respective suspension members 80 may be variably controlled with a method of selectively supplying power to the plurality of excite coils 31 and 32 installed at opposite sides of the fixing member 21 or differentiating the strength of electric current applied to the respective excite coils 31 and 32. This is effective to control a rolling phenomenon caused when the lens holder 40 is moved in an optical axis direction (focus direction), thereby achieving a more stable operation of the optical pickup device.

As is apparent from the above description, aspects of the present invention provide an optical pickup device that can selectively apply a magnetic field to magnetic fluid by controlling an electric current to be supplied to excite coils 31, 32, 33, and 34 of a supporting unit 20, thereby keeping the magnetic fluid 24 in a liquid state or changing the magnetic fluid 24 to a high-viscosity gel state. As a result, the optical pickup device can change a natural frequency thereof according to a change in the rotation frequency of an optical disk 1, and can accomplish a stable operation in both low-speed and high-speed modes.

Furthermore, in the optical pickup device according to aspects of the present invention, by selectively supplying power to the plurality of excite coils 31, 32, 33, and 34 of the supporting unit 20 or differentiating the strength of electric current to be supplied to the respective excite coils 31, 32, 33, and 34, it is possible to provide a plurality of suspension members 80 with different natural frequencies from one another. This has the effect of controlling a rolling phenomenon caused when a lens holder 40 is moved in an optical axis direction (focus direction), and consequently, accomplishing a more stable operation of the optical pickup device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup device comprising:
   a lens holder to support an objective lens;
   a supporting unit spaced apart from the lens holder; and
   one or more suspension members, each having one end fixed to the lens holder and another end supported by the supporting unit, to enable a movement of the lens holder, wherein
   the supporting unit comprises:
      a fixing member;
      one or more coupling portions provided in the fixing member to couple each suspension member therein;
      a magnetic fluid receiving portion disposed in each of the one or more coupling portions and surrounding the suspension member;

magnetic fluid disposed in the magnetic fluid receiving portion to surround a portion of each suspension member; and an excite device disposed in the magnetic fluid receiving portion to directly surround the magnetic fluid to apply a magnetic field to the magnetic fluid, the one or more coupling portions comprising:
- a first coupling portion having a first elastically deformable coupling agent provided therein;
- a second coupling portion spaced apart from the first coupling portion and having a second elastically deformable coupling agent provided therein; and
- a space between the first coupling portion and the second coupling portion having the magnetic fluid provided therein.

2. The optical pickup device as claimed in claim 1, wherein the first elastically deformable coupling agent and the second elastically deformable coupling agent are silicon-based adhesives.

3. The optical pickup device as claimed in claim 1, wherein the excite device comprises at least one excite coil.

4. The optical pickup device as claimed in claim 3, wherein the at least one excite coil is provided on at least one of an upper surface, a lower surface, and side surfaces of the fixing member.

5. The optical pickup device as claimed in claim 3, wherein the at least one excite coil surrounds the magnetic fluid.

6. The optical pickup device as claimed in claim 1, wherein the magnetic fluid is a colloid solution comprising ferromagnetic particles uniformly dispersed in a fluid.

7. The optical pickup device as claimed in claim 1, wherein power is supplied to the excite device to apply the magnetic field to the magnetic fluid and control a viscosity of the magnetic fluid and a deformable portion of each suspension member.

8. The optical pickup device as claimed in claim 7, wherein:
- a first amount of power is supplied to the excite device to apply a first magnetic field to the magnetic fluid such that the magnetic fluid has a first viscosity and the deformable portion of each suspension member has a first length; and
- a second amount of power, greater than the first amount of power, is supplied to the excite device to apply a second magnetic field to the magnetic fluid such that the magnetic fluid has a second viscosity, greater than the first viscosity, and the deformable portion of each suspension member has a second length, less than the first length.

9. The optical pickup device as claimed in claim 8, wherein the first amount of power is supplied to the excite device when an optical disk drive rotates in a low-speed mode and the second amount of power is supplied to the excite device when the optical disk drives rotates in a high-speed mode.

10. The optical pickup device as claimed in claim 7, wherein the excite device comprises a first excite coil on a first side of the fixing member to apply a first magnetic field and a second excite coil on a second side of the fixing member, different from the first side, to apply a second magnetic field.

11. The optical pickup device as claimed in claim 10, wherein a first amount of power is supplied to the first excite coil to apply the first magnetic field and a second amount of power, different from the first amount of power, is supplied to the second excite coil to apply the second magnetic field.

12. The optical pickup device of claim 1 wherein the supporting unit controls a change in a natural frequency of each suspension member according to a rotation frequency of the optical disk.

13. A method of stably supporting an objective lens in an optical pickup device the method comprising:
- fixing a first end of one or more suspension members to a lens holder that holds the objective lens, and a second end of each suspension member to a supporting unit of the optical pickup device to enable a movement of the lens holder; and
- supplying power to a magnetic fluid surrounding the one or more suspension members in the supporting unit in order to apply a magnetic field to the magnetic fluid and control a length of a deformable portion of each suspension member and supplying the power to at least one excite coil provided on the supporting unit,
- wherein the at least one excite coil comprises a first excite coil on a first side of the supporting unit to apply a first magnetic field and a second excite coil on a second side of the supporting unit, different from the first side, to apply a second magnetic field,
- wherein the supplying of the power to the at least one excite coil comprises:
  - supplying a first amount of power to the at least one excite coil when the optical disk drives rotates in a low-speed mode to apply a first magnetic field to the magnetic fluid such that the magnetic fluid has a first viscosity and the deformable portion of each suspension member has a first length; and
  - supplying a second amount of power, greater than the first amount of power, to the at least one excite coil when the optical disk drives rotates in a high-speed mode to apply a second magnetic field to the magnetic fluid such that the magnetic fluid has a second viscosity, greater than the first viscosity, and the deformable portion of each suspension member has a second length, less than the first length.

14. The method as claimed in claim 13, wherein the at least one excite coif surrounds the magnetic fluid.

15. The method as claimed in claim 13, wherein the magnetic fluid is a colloid solution comprising ferromagnetic particles uniformly dispersed in a fluid.

16. The method as claimed in claim 13, wherein the supplying of the power comprises supplying the power to control a viscosity of the magnetic fluid.

17. The method as claimed in claim 13, wherein the supplying of the power to the at least one excite coil comprises:
- supplying a first amount of power to the first excite coil to apply the first magnetic field; and
- supplying a second amount of power, different from the first amount of power, to the second excite coil to apply the second magnetic field.

* * * * *